UNITED STATES PATENT OFFICE 2,221,373

CANDY

Jesse K. Farley, Jr., Evanston, Ill.

No Drawing. Application June 14, 1940,
Serial No. 340,469

4 Claims. (Cl. 99—134)

This invention relates to improvements in coated candies having jelly or gum centers and, among other objects, aims to provide a more pleasing and attractive candy of this character.

The nature of the invention may be readily understood by reference to one illustrative product and its method of manufacture. Candy of the character here involved falls in the class of so-called pan coated candies having gum or jelly centers. Such centers were originally designated as "gum" because of the use of gum arabic. Commercial corn syrup (glucose) has long ago displaced gum arabic and together with so-called soluble or thin boiling starch has provided a center which is much softer than true gum arabic centers and which is more properly called a jelly. However, in the trade "jelly" and "gum" are generally used synonymously. The jelly produced with commercial corn sugar is clear soft jelly. One form of candy with a coated jelly center is the familiar so-called jelly bird eggs. Jelly beans are another form. Both the jelly eggs and jelly beans are characterized by a smooth or polished colored coating. Though they are quite wholesome and inexpensive, they have lost favor because of their cheap exterior appearance with the result that it is difficult to sell candy of this character, and they have now become regarded as cheap candy, this appellation also implying poor or inferior quality.

The cheap appearance of these candies apparently resides in the poor color or lack of uniformity of color. This is particularly noticeable in the delicate pastel coatings which are ordinarily preferable and generally regarded as essential in high grade and attractive candies. The trade has attempted to conceal this defect by the use of brilliant and striking colors, such as reds, orange, dark greens and black. These dark and striking colors, however, had the effect of accentuating the "cheap" appearance of the candy.

The unattractive appearance of coated candy of this character has been a defect of long standing. In an effort to improve the salability of these candies, I have discovered that the cause of the unattractive appearance of the coating has been the clarity or transparency of the jelly centers. This unattractive appearance of the coating is probably due to transmission of light through the jelly centers and the coating itself. Whether it results from a non-uniform transmission of light through the coating or simply because light is permitted to pass through the coating, I am not certain. In any event, I have discovered that it may be entirely eliminated by the use of relatively opaque jelly centers. The centers should be sufficiently opaque to reduce transmission of light to a negligible amount. Opaque jelly centers produce a uniform and attractive color effect in the coating even in the most delicate pastel shades, with the result that these coated candies may be made with the more attractive pastel shades. The resulting product has a vastly improved appearance and no longer looks cheap with the result that this candy is being restored to favor with the public.

In making the improved candy, the standard methods of manufacture are employed. The jelly centers may be made from the usual ingredients, that is, commercial corn syrup, cane sugar and a small amount (about 10%) of thin boiling starch. To these standard ingredients is added a small amount of material for clouding the jelly, that is, making it relatively opaque in final form. The clouded or opaque effect may be produced by various edible colloids, such as albumen, unmodified starches, flour, etc., also by edible whipped materials containing air, such as marshmallow. The material added should, of course, be wholesome and should not affect the quality of the finished product and should be preferably inexpensive so as not to increase the cost of manufacture.

A typical formula for jelly centers is the following:

|  | Percent |
|---|---|
| Sugar | 25 to 40 |
| Corn syrup | 50 to 65 |
| Cooking starch | 10 |
| Jelly clouding material | 2 to 10 |

Flavoring materials are, of course, used and I prefer to color the jelly although the external appearance of the coated candy is the same whether the jelly center be colored or uncolored. The jelly may be molded in the conventional manner, such as in conventional starch molds.

The completed centers are relatively opaque instead of clear but in other respects they have the same consistency as the old form of jelly centers. They are then finished by so-called panning operations which generally comprise tumbling the centers in rotating pans together with the coating materials. In general the first step in the panning operation is to wet the centers with sugar syrup and then to add fine granulated sugar which adheres to the centers and forms a sugar coating. This coating is made smooth by successive syrup wettings and the addition of finer sugar and eventually powdered sugar.

Eventually a dry and smooth coating is developed. Color is supplied generally at a late stage in the panning process in the form of a colored sugar syrup. The coating may be polished by the use of wax.

The resulting coating is attractive and absolutely uniform in color even in the most delicate pastel shades. The enhanced attractive appearance of the candy has very greatly increased its marketability.

Obviously the invention is not limited to the details of the illustrative product or its method of manufacture since these may be variously modified. Moreover it is not indispensable that all features of the invention be used conjointly since various features may be used to advantage in different combinations and subcombinations.

Having described my invention, I claim:

1. Candy having a clouded colored jelly center and a smooth colored translucent coating.

2. A candy egg comprising a clouded jelly center and a smooth colored translucent sugar coating.

3. Candy having a jelly center and a smooth colored translucent coating, said center being clouded to reduce transmission of light through the center and its coating, whereby the color effect of the coating is produced substantially entirely by reflected light.

4. A coated jelly candy comprising in combination a clouded jelly center coated with a smooth, translucent colored sugar coating, said center being clouded to prevent transmission of a substantial amount of light through the coating.

JESSE K. FARLEY, JR.